US010930062B2

(12) United States Patent
Gallaway et al.

(10) Patent No.: US 10,930,062 B2
(45) Date of Patent: Feb. 23, 2021

(54) 3D VIEW MODEL GENERATION OF AN OBJECT UTILIZING GEOMETRICALLY DIVERSE IMAGE CLUSTERS

(71) Applicant: RAYTHEON COMPANY, Waltham, MA (US)

(72) Inventors: Jacob Wesely Gallaway, Melissa, TX (US); Jeremy Jens Gerhart, Richardson, TX (US); Stephen J. Raif, Sachse, TX (US); Jody Dale Verret, Rockwall, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/516,155

(22) Filed: Jul. 18, 2019

(65) Prior Publication Data

US 2021/0019937 A1  Jan. 21, 2021

(51) Int. Cl.

| | | |
|---|---|---|
| *G06T 17/05* | (2011.01) | |
| *G06T 17/00* | (2006.01) | |
| *G06T 15/06* | (2011.01) | |
| *G06T 7/60* | (2017.01) | |
| *G06T 7/00* | (2017.01) | |

(Continued)

(52) U.S. Cl.
CPC ............ *G06T 17/05* (2013.01); *G06T 7/0002* (2013.01); *G06T 7/32* (2017.01); *G06T 7/60* (2013.01); *G06T 7/97* (2017.01); *G06T 15/06* (2013.01); *G06T 15/20* (2013.01);
(Continued)

(58) Field of Classification Search
CPC ................................ G06T 17/00; G06T 17/05
See application file for complete search history.

(56) References Cited

U.S. PATENT DOCUMENTS

| | | | |
|---|---|---|---|
| 9,430,872 B2 | 8/2016 | Raif et al. | |
| 2006/0109308 A1* | 5/2006 | Miyamoto | ........... H04N 1/4057 347/43 |

(Continued)

OTHER PUBLICATIONS

Gruen, et al. "3D Precision Processing of High-Resolution Satellite Imagery" ASPRS 2005 Annual Conference, "Geospatial Goes Global: From Your Neighborhood to the Whole Planet" Mar. 7-11, 2005 (14 pgs.).

(Continued)

*Primary Examiner* — Yi Yang
(74) *Attorney, Agent, or Firm* — Lewis Roca Rothgerber Christie LLP

(57) ABSTRACT

A computer vision method, executed by one or more processors, for generating a single 3D model view of a geographic scene includes: receiving image data for the scene from a plurality of sensors located at different angles with respect to the geographic scene; dividing the image data into a plurality of image spatial regions; correlating the image data in each image spatial region to obtain a score for each image data in each image spatial region; grouping the image data in each image spatial region into two or more image clusters, based on the scores for each image; performing a multi-ray intersection within each image cluster to obtain a 3D reference point for each region; for each region, combining the one or more clusters, based on the 3D reference point for the region; and registering the combined clusters for each region to obtain a single 3D model view of the scene.

18 Claims, 6 Drawing Sheets

(51) Int. Cl.
*G06T 7/32* (2017.01)
*G06T 15/20* (2011.01)

(52) U.S. Cl.
CPC .............. *G06T 2207/10028* (2013.01); *G06T 2207/20221* (2013.01); *G06T 2207/30168* (2013.01)

(56) References Cited

U.S. PATENT DOCUMENTS

| | | | | |
|---|---|---|---|---|
| 2012/0218322 | A1* | 8/2012 | Shiomi | G02F 1/136286 345/690 |
| 2013/0265307 | A1* | 10/2013 | Goel | G06T 15/005 345/426 |
| 2014/0112536 | A1 | 4/2014 | Ely et al. | |
| 2014/0253543 | A1* | 9/2014 | Raif | G06T 17/00 345/419 |
| 2015/0248584 | A1* | 9/2015 | Greveson | G06K 9/46 382/113 |
| 2016/0026264 | A1* | 1/2016 | Cheng | G06F 3/0308 345/156 |
| 2017/0116776 | A1* | 4/2017 | Aughey | G06T 19/00 |
| 2018/0091921 | A1* | 3/2018 | Silva | H04S 7/304 |
| 2018/0330149 | A1* | 11/2018 | Uhlenbrock | G06T 7/11 |

OTHER PUBLICATIONS

Xiang, et al. "Mini-Unmanned Aerial Vehicle-Based Remote Sensing: Techniques, Applications, and Prospects", Journal of LATEX Class Files, vol. 14, No. 8, arxiv. org, Cornell University Library, 201 Olin Library Cornell University Ithaca, NY, Dec. 19, 2018 (28 pgs.).

International Search Report for corresponding International Application No. PCT/US2020/033484, filed May 18, 2020, International Search Report dated Jul. 23, 2020 and dated Aug. 7, 2020 (5 pgs.).

Written Opinion of the International Searching Authority for corresponding International Application No. PCT/US2020/033484, filed May 18, 2020, Written Opinion of the International Searching Authority dated Aug. 7, 2020 (8 pgs.).

* cited by examiner

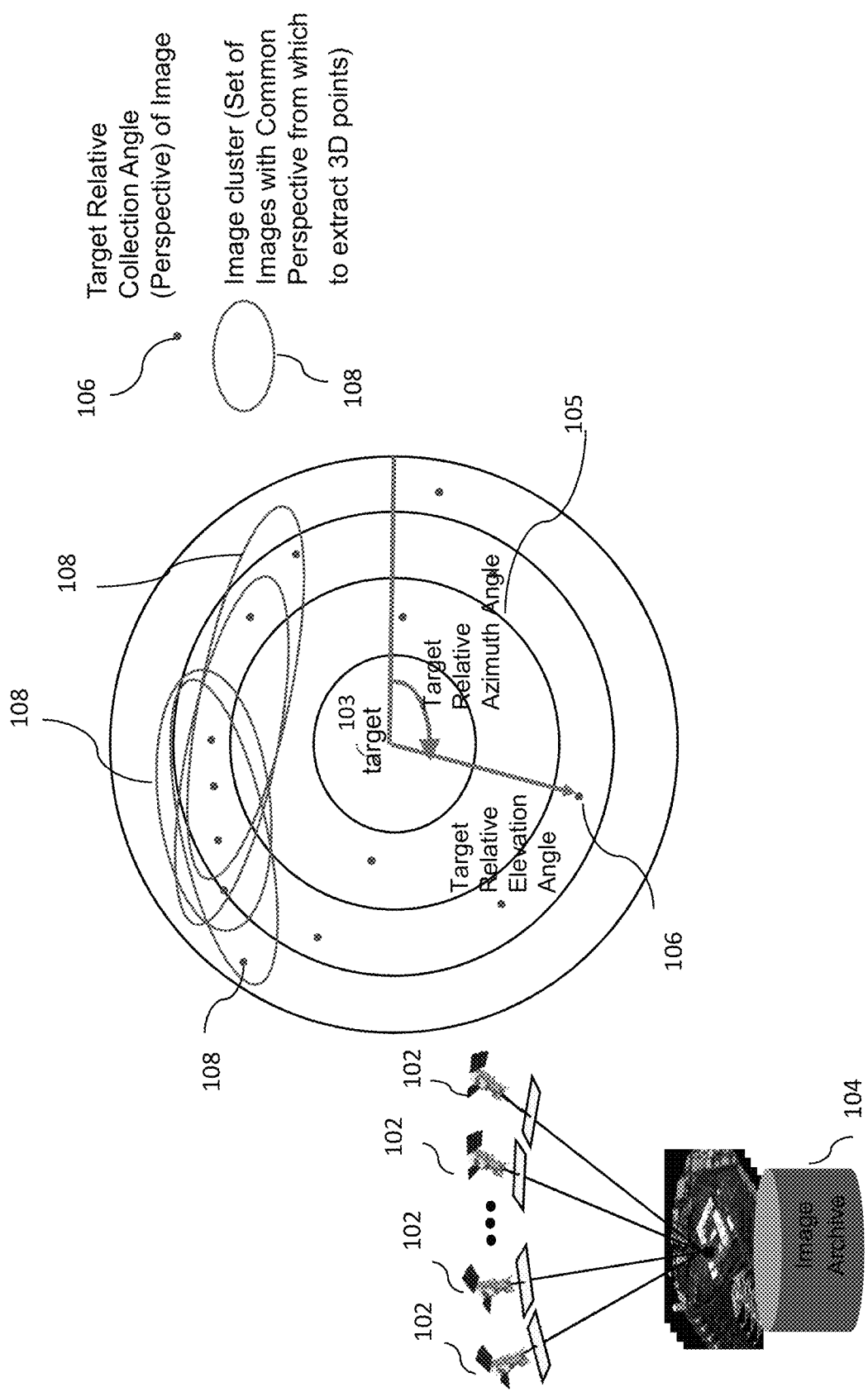

3D VIEW MODEL GENERATION OF AN OBJECT UTILIZING GEOMETRICALLY DIVERSE IMAGE CLUSTERS

FIELD OF THE INVENTION

The disclosed invention relates generally to computer vision and more specifically to a system and method for 3D view model generation of an object utilizing geometrically diverse image clusters.

BACKGROUND

Computer vision is directed to methods for computers gaining high-level understanding from digital images or videos. Typical computer vision techniques include methods for acquiring, processing, analyzing and understanding digital images, and extraction of high-dimensional data from the real world to produce numerical or symbolic information, for instance, in the forms of decisions. This image understanding is typically performed by extraction of symbolic information from image data using models constructed with the aid of geometry, physics, statistics, and/or learning theory.

Photogrammetry is a technique of making measurements from photographs, for example, for recovering the positions of surface points. Photogrammetric analysis may be applied to images and remote sensing to detect, measure and record complex 2D and 3D motion fields by feeding measurements and imagery analysis into computational models to estimate the actual 3D relative motions.

Photogrammetrically-extracted 3D coordinates of an object (target) define the locations of object points in the 3D space. Image coordinates define the locations of the object points' images on an electronic imaging device. Exterior orientation of a camera or a sensor defines its location in space and its view direction. Interior orientation parameters define the geometric parameters of the imaging process. Interior parameters consist primarily of the effective focal length of the imaging sensor optical system, but can also include the mathematical models of optical distortions. Further observations can play an important role. For example, with scale bars, basically a known distance of two points in space, or known fix points, the connection to the basic measuring units is created.

The 3D coordinates points are typically found by utilizing multiple tie-points (i.e., the same ground point observed in two or more images) in the form of image coordinates. A multiple ray intersection using triangulation can then be performed to generate a single 3D point.

A point cloud is a set of points in a three-dimensional coordinate system. In general, a point cloud is a three-dimensional model of a scene on the earth. In geographic information systems, for example, point clouds are used to make digital elevation models of the terrain, or to generate three-dimensional models of, for instance, an urban environment. Point clouds can be formed by combining two-dimensional images captured from two or more perspectives.

Point cloud generation from passive imagery can, however, be a computationally expensive and time consuming process. Moreover, the quality of point cloud generation from images from airborne or spaceborne sensor platforms (henceforth jointly referred to as "platforms") may suffer from voids due to shadows, atmospheric obscuration, clouds and the like. This poor quality may be compensated, to some extent, by utilizing images collected from a diverse geometrical set (image clusters). However, the point cloud quality can still be poor or not optimal, if these image clusters are chosen in a suboptimal way FIG. 1 is a simplified block diagram depicting clustering of images from airborne or spaceborne (e.g., satellite) platforms. As shown, a plurality of platforms 102, such as satellites, capture images of a target 103 from different view angles. The images are then stored in an image archive 104 on a storage device. Image locations 106 are then mapped with respect to their distances 105 from the target 103. This is done by finding the same ground point on the imagers of the platforms 102 and then performing triangulation to find the correct point in ground space. At this point the algorithm is grouping images into clusters based on their target relative collection angles, which is calculated geometrically without the need for tie-points or any other photogrammetric process.

The goal is to pick groups of images that have strong "geometric correlation" (i.e. similar perspective and illumination). Accordingly, the image locations are then grouped into several image clusters 108 based on convergence angle between groups of images as well as strength of correlation utilizing normalized cross correlation over the epipolar line of one image in another image. That is, the image data is divided into a plurality of image spatial regions (image clusters). The image data in each cluster 108 (image spatial region) is then correlated to obtain a score for each cluster, utilizing normalized-cross correlation performance prediction method described in a co-owned U.S. Pat. No. 9,430,872, entitled, "Performance prediction for generation of point clouds from passive imagery," the entire contents of which is hereby expressly incorporated by reference. The method describes generating point clouds from passive images, where image clusters are formed, each including two or more passive images selected from a set of passive images. The quality of the point cloud that could be generated from each image cluster is predicted for each image cluster based on a performance prediction score for each image cluster. A subset of image clusters is then selected for further processing based on their performance prediction scores. A mission-specific quality score is then determined for each point cloud generated and the point cloud with the highest quality score is selected for storage.

Referring back to FIG. 1, the scores (strength) of the clusters are then used to select one or more optimal clusters from the clusters 108. The cluster of images are then used to get a 3D point cloud by performing a dense tie-point extraction, where tie-points are attempted to be found for every point in the groups of images. The tie-points are then used for multi-ray intersection to find every 3D ground point (cloud point) that were viewed by this group of images. Consequently, these approaches rely on tie-point correlation scores for cloud point generation.

However, since these approaches use only the strength (score) of the clusters to select the optimal clusters, they can cause occlusion due to obscuration or shadows as the attitude and location of the imager is not taken into account. This can lead to clusters such as 108 where only one side of a target is viewable.

SUMMARY

In some embodiments, the disclosed invention is directed to a computer vision technique that clusters images of a scene taken from different viewpoints (angles) and uses multiple images of a scene to extract a 3D point cloud representing the surfaces in the scene, from passive imagery.

In some embodiments, the disclosed invention is a computer vision method, executed by one or more processors, for generating a single 3D model view of a geographic scene. The method includes: receiving image data for the scene from a plurality of sensors located at different angles with respect to the geographic scene; dividing the image data into a plurality of image spatial regions; correlating the image data in each image spatial region to obtain a score for each image data in each image spatial region; grouping the image data in each image spatial region into two or more image clusters, based on the scores for each image; performing a multi-ray intersection within each image cluster to obtain a 3D reference point for each region; for each region, combining the one or more clusters, based on the 3D reference point for the region; and registering the combined clusters for each region to obtain a single 3D model view of the scene.

In some embodiments, registering the combined clusters includes: rasterizing patches in two or more point clouds derived from the two or more image clusters; determining 3D tie-points between the two or more point clouds via cross correlation processing; performing a 3D bundle adjustment to determine misregistration error model parameters between the two or more point clouds; applying the misregistraiton error model parameters to original point clouds, resulting in registered point clouds; and merging the registered point clouds, resulting in a single, dense point cloud comprising of point clouds from each cluster.

In some embodiments, the image data is divided into the plurality of image spatial regions by selecting a reference image, finding correlation sets with higher strength that have diversity of convergence angles and ensuring image spatial regions have the largest convergence angles from all other groups and correlating the image data may utilize performance prediction.

Correlating the image data may include geometrically analyzing each image spatial region and photogrammetrically analyzing each image spatial region to obtain a score for each image data in each image spatial region. The score indicates a predicted quality of a point cloud generated from a corresponding image spatial region.

In some embodiments, the multi-ray intersection generates dense tie-points as a set of 1-to-N tie-points that resolve to an XYZ location in a 3D space to generate a point cloud from a reference image's perspective with a resolution half as dense as an original reference image. Combining the two or more clusters may include merging multiple point clouds from each cluster perspective into a single point cloud representing the full scene.

BRIEF DESCRIPTION OF THE DRAWINGS

These and other features, aspects, and advantages of the disclosed invention will become better understood with regard to the following description, appended claims, and accompanying drawings.

FIG. 1 is a simplified block diagram depicting clustering of images from platforms.

DETAILED DESCRIPTION

In some embodiments, the disclosed invention is directed to a computer vision technique, executed by one or more processors, that uses multiple images of a scene to extract a 3D point cloud representing the surfaces in the scene, from passive imagery. In some embodiments, the computer-executed process clusters images of a scene taken from different viewpoints (angles), for example, from a plurality of satellites or airborne platforms. The process then groups the images into distinct azimuth and elevation regions and independently creates several models from the image clusters. Since the point clouds were generated from different view angles, obscuration effects are known and the generated point clouds are complementary. For example, if the point clouds were generated from a common view angle (i.e. same perspective), then any void caused by occlusion/obscuration in one point cloud will be correlated (matched) in the other points clouds. On the other hand, if the point clouds were generated from different view angles (i.e. different perspectives), then voids across the different point clouds should be uncorrelated because what is occluded from one perspective may be perfectly visible from a different perspective. The process then registers all of the models and merges them together to generate a single 3D model of the target.

Figure 2A:
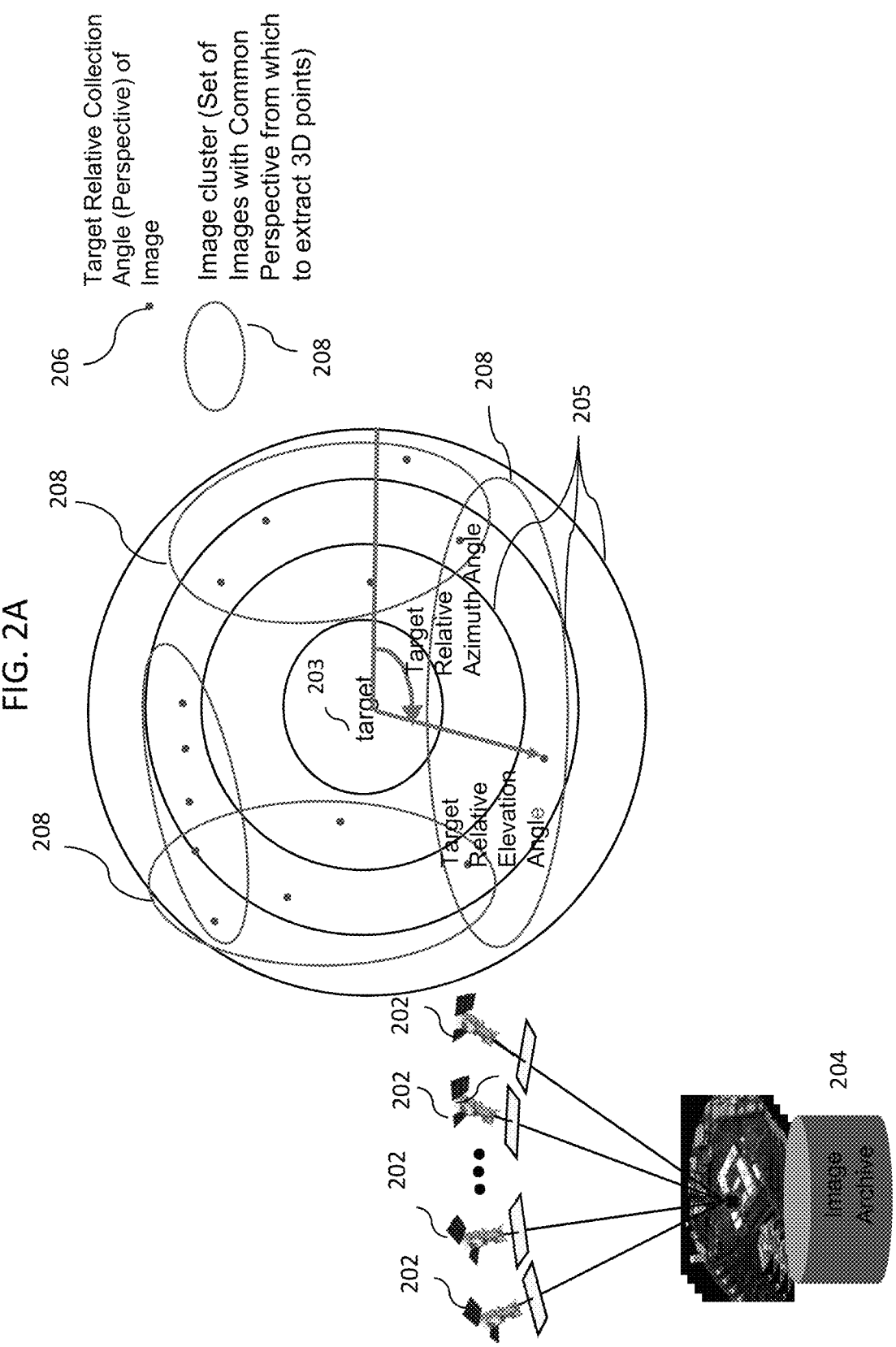
FIG. 2A is a simplified block diagram illustrating clustering of images from platforms, according to some embodiments of the disclosed invention.

FIG. 2A is a simplified block diagram illustrating clustering of images from platforms executed by one or more processors, according to some embodiments of the disclosed invention. Similar to FIG. 1, a plurality of platforms 202, such as satellites, capture images of a target 203 from different view angles, for example, via a variety of different sensors. The images are then stored in an image archive 204 on a storage device. Image locations 206 are then mapped with respect to their distances 205 from the target 203, for example, in distinct azimuth and elevation regions.

The image locations are then grouped into several image clusters 208 based on diversity of image geometry. In some embodiments, the image clusters are chosen by selecting a reference image, finding optimal correlation sets that have some convergence angles and then ensuring other image clusters utilized have the largest convergence angles possible from all other groups. This way, the image data is divided into a plurality of image spatial regions (clusters). The image data in each cluster 208 (image spatial region) is then correlated to obtain a score for each cluster, utilizing normalized-cross correlation performance prediction method described in the U.S. Pat. No. 9,430,872. In summary, the clusters are analyzed geometrically (via geometry metadata only) and then analyzed photogrammetrically (via imagery cross correlation based) in a 2-step approach, using the equations for calculating the scores, which are described are described in the U.S. Pat. No. 9,430,872. The scores (strength) of the clusters are then used to select one or more optimal clusters from the clusters 208. This way, all images over the region are tested and weighted for tight correlation based on solar angle and convergence angle clusters to reduce noise but leaves voids in areas not seen. In some embodiments, the disclosed invention makes up to 8 of these models and then combines them.

In some embodiments, an image acquisition system, executing a computer vision process, according to some embodiments of the disclosed invention includes an image acquisition platform and a control system platform, each with one or more processor, associated storage media, and input/output and communication circuitries, known in the art. The control system platform receives information regarding the scene to be captured and determines the image acquisitions to be made (by the image acquisition platform) as a function of that information.

Figure 2B:
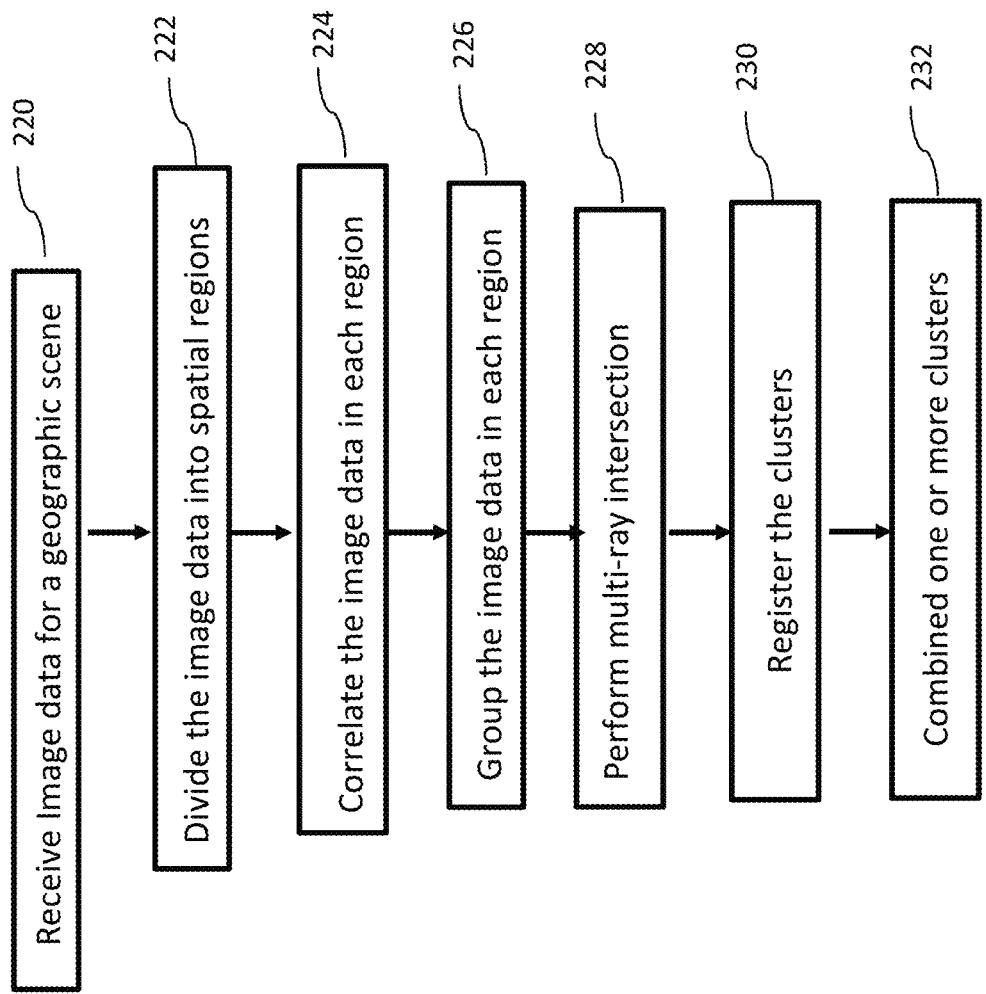
FIG. 2B is a simplified process flow diagram for generating a 3D view model of a scene, according to some embodiments of the disclosed invention.

FIG. 2B is a simplified process flow diagram for generating a 3D view model of an object executed by one or more processors, according to some embodiments of the disclosed invention. As shown in block 220, a computer vision process, executed by one or more processors, receives image data for a geographical scene, for example one or more targets, from a plurality of image sensors located at different angles with respect to the scene, for example, on airborne platforms. In block 222, the image data is divided into a plurality of image spatial regions (e.g., image clusters 208 in FIG. 2A), for example, based on convergence angle between groups of images as well as strength of correlation. In some embodiments, the image data is divided into distinct azimuth and elevation regions, as the image clusters. In block 224, the image data is correlated in each image spatial region to obtain a score (strength) for each image data.

In block 226, the image data in each image spatial region (each perspective) is grouped into one or more image cluster, based on the scores (strength) for each image that is obtained in block 224. In block 228, a multi-ray intersection is performed within each image cluster to obtain a point cloud for each region representing the surfaces in the image (scene) of each region. This way, each cluster eventually results in a separate point cloud by the end of the process in block 228. An exemplary multi-ray intersection process is described in detail below with respect to block 308 of FIG. 3. In block 230, the clusters for each region are registered using a 3D registration process described in FIG. 5 below to obtain a 3D reference point (point cloud) for each region.

For each region, the one or more clusters are combined, based on the 3D reference point (point cloud) for the region, in block 232. That is, multiple point clouds are merged for the current scene (i.e. "geographic spatial region") into a single point cloud representing the scene to obtain a single 3D model view of the scene. In other words, the independent point clouds built from different scene perspectives are merged into a final point cloud. The resulting 3D point cloud can be used for any analytics that require a knowledge of a 3D scene, such as any enemy threat determination, flood modeling, aircraft landing zone suitability, or detection of 3D objects, such as buildings, structures, human activity (scene changes over time), and the like.

In some embodiments, multi-ray intersection within each selected optimal cluster is performed to obtain a 3D reference point for each region and the one or more optimal clusters are combined for each region, based on the 3D reference point for the region. Finally, the combined clusters are registered for the plurality of regions to obtain a single 3D model view of the scene.

In contrast to the previous approaches of FIG. 1 that generates the cloud points by relying on tie-points, the present approach also takes into account image geometry and independently generates multiple models and then registers the models to create a (single) merged view model of the scene (for example, a particular target location within the scene as represented in 203).

Figure 3:
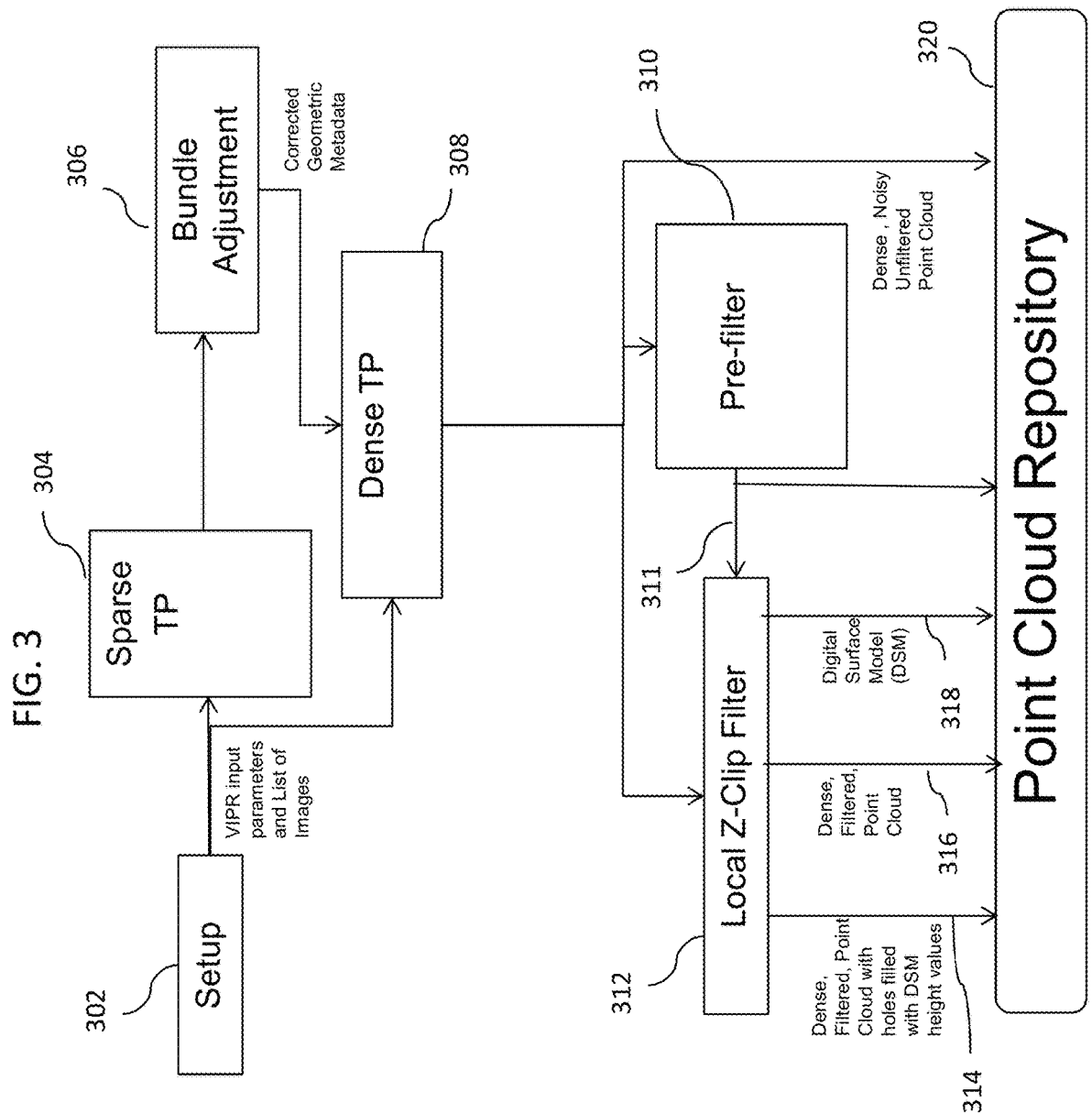
FIG. 3 is a simplified process flow diagram for generating cloud points, according to some embodiments of the disclosed invention.

FIG. 3 is a simplified process flow diagram for generating cloud points executed by one or more processors, according to some embodiments of the disclosed invention. As shown in block 302, the process is set up by selecting various parameters for input images, tie-point generation, cluster adjustments, server processing, post-processing and the like, depending on the environment, system requirements and output requirements.

As shown in FIG. 3, the output of the set up process 302 includes Video and Image Photogrammetric Registration (VIPR) parameters and commands, and a list of the image clusters. This output is then input to a sparse tie-point generation block 304 that uses 2D sparse correlators to generate (sparse) tie-points between clusters of images. The number of sparse tie-points may be in thousands for some cases. Exemplary 2D sparse correlators are described in the U.S. Pat. No. 9,430,872, the entire contents of which is expressly incorporated by reference herein. For example, a correlator-based performance prediction is used on each image cluster to obtain a corresponding correlator-based performance quality score for each image cluster. The correlator-based performance quality score indicates the predicted quality of a point cloud generated from the corresponding image cluster. A third plurality of image clusters are then selected from the second plurality of image clusters based on the correlator-based performance quality score.

Tie-points are then generated in step 304. Tie-point generation is described in more detail below. In some embodiments, the well-known Normalized Cross Correlation technique is utilized to for generating the tie-points in step 304. When calculating a tie-point via cross correlation, a candidate pixel location from a reference image is chosen, and a small region around that candidate pixel location is chipped from the "reference" image (called a template window). Then, the template window "slides" over a search region in the "reference complement" image, generating a correlation score at each candidate location. The correlation scores comprise a 2D correlation surface, where the highest score can be found at the location where the reference candidate pixel location best matches a location in the reference complement image. This pairing of a pixel location in the reference image and a pixel location in the reference complement image is a tie-point. One can capture multiple metrics from a single tie-point calculation. For instance, a tie-point correlation score can be calculated as the peak score on the correlation surface for the tie-point. A high score indicates a higher likelihood of a match than a low score.

In some embodiments, the sparse tie-point generation 304 utilizes a VIPR tool set as follows:

As a setup for the tool set:

Read imagery from the filesystem (e.g., image archive 204 of FIG. 2) and build image pyramids (reduced resolution imagery).

Read Rational Polynomial Coefficients (RPCs, or similar geometry parameters) from the file system and build a Line-of-Site (LOS) vector grid to use for interpolated ray intersections.

Read configuration values from the input parameters to determine how to generate the tie-points.

Optionally, if available, read a digital elevation map (DEM) for the geographic region covered by these images.

Using the LOS vector grid and the knowledge of the elevation (e.g., RPC value, user provided value, or DEM based), build a grid of geometric tie-points that map from locations in the reference image to the non-reference images. At this point, the mapping is geometric only and prone to error. The sources of error in the original mapping may be LOS errors caused by errors in the original imaging geometry, and elevation errors caused by unknowns in the elevation map The process to improve the image-to-image mappings by use of image-to-image tie-points is delineated below. For each registration level in the command input parameters:

- Resample each non-reference image into the reference image space using the current image-to-image mapping grid.
- Apply a convolution kernel (based on sensor and geometry characteristics) to one or both images to achieve equivalent resolution.
- Extract edge magnitude images and phase images from the imagery.
- Execute a 2D FFT-optimized normalized cross correlation over a grid of points on the edge magnitude and phase images and use the correlation scores to refine the current image-to-image mapping.
- Compute the statistics of the correlation scores and the image-to-image mapping and use the statistics to reject "weaker" correlation scores, "weaker" figure of metrics, and geometric outliers.
- Combine the refined mappings for all non-reference images and reject very large geometric outliers that indicate a tie-point blunder (based on a predetermined threshold), but do not reject smaller geometric outliers that could have been caused by errors in the input image geometry.
- Use a hole-filling process to fill vacancies in the refined image-to-image mapping caused by the blunder rejection steps. Holes can be filled with any standard hole-filling technique, such as local averaging or Delaunay triangulation. In some embodiments, eight to twelve registration levels are performed, where each registration level operates at a higher resolution level on a denser grid with a smaller correlation search area. This allows the process to handle both large errors and smaller errors.

Export Tie-points

For sparse tie-point generation, the results of the last registration level is searched for the highest quality 1-to-N tie-points that tie the single reference image to the N non-reference images. In some embodiments, the best 1000 1-to-N tie-points are selected, where all 1000 points have a high-confidence match (based on a predetermined threshold) to all images in the set. These tie-points are then exported for use by the bundle adjustment process in block 306.

In some embodiments, the set up parameters of the tool include several or all of the following parameters.

Input Parameters:

- Tie-point generation strategy, which defines a set of registration pyramid levels. For each level, the image pyramid level is defined, the suggested tie-point search area and template window size, the grid spacing between correlations, the type of correlator to use, and the types of blunder rejection to use. These values are based on the type and number of images being used, and are typically set to default values for the default image cluster case.
- Bundle adjustment parameters, such as iteration convergence tolerances, blundering thresholds, and the selection of adjustable parameters in the geometric correction.
- Server processing parameters, such as the number of CPUs to use for each step. These values are based on the server hosting the algorithm.
- Post-processing parameters, which define the quality threshold for both metric and Z-clip filtration. These are default values that must occasionally be tuned for certain test cases.

Input Imagery:

A set of one or more image clusters, where each cluster is composed of one "reference" image and one or more "non-reference" images. The reference image defines the perspective from which the point cloud will be built for that cluster. Multiple clusters are used to build a point cloud from multiple perspectives.

There are two input imagery strategies: independent clusters, and co-collection clusters.

Independent Clusters are clusters build from imagery collected independently from each other.

- The default input imagery set is 1 cluster of 5 images.
  - 1 cluster of 5 images is the optimal trade-off between point cloud quality (high signal to noise ratio) and processing time. Smaller clusters have significantly more noise, and larger clusters take much longer to process.
  - In the optimal case of the default imagery set, the reference image is within a few degrees of nadir, and the 4 non-reference images surround it with a 3-15 degree convergence angle with respect to the reference. This provides opportunity to colorize buildings from all 4 sides using a single cluster. Also, it minimizes occluded regions caused by buildings.
  - Sometimes, 1 cluster of 5+ images are used, with 5 images dedicated to point cloud generation, and the full 5+ set used to increase geometric diversity in the bundle adjustment and colorization.
- A simple input imagery set is 1 cluster of 2 images, separated by a 3-15 degree convergence angle. This set frequently has blunders (noise) caused by ambiguous feature matches along the epipolar line. To reduce noise, a more conservative tie-point generation strategy is often used, particularly by increasing the template window sizes to reduce feature ambiguities. However, more complex input imagery sets can be built, such as N clusters of four to eight images. More complex sets are not as well understood; thus they are currently not automated and must be built with operator involvement. Complex imagery sets are often useful to model "urban canyon" scenes, where there is no single geometry that can properly model the entire scene.

Co-collection Clusters are clusters built from images collected in a single satellite orbital pass (or single airborne imaging pass). This type of cluster provides an optimal data set for passive 3D point cloud extraction. For this scenario, the optimal input imagery configuration may be a cluster of 7 images, with adjacent images separated by about 4 degrees. Additional 7-image clusters can be added, using a 2-image overlap between clusters to ensure that all clusters can be tied together geometrically.

Referring back to FIG. 3, in block 306, the sparse tie-points from block 304 are analyzed geometrically to refine the original geometry parameters into new corrected geometry parameters that minimize the relative error between the images, and can also reduce absolute geolocation errors.

The photogrammetric image bundle adjustment is a non-linear weighted least squares process that estimates corrections for errors in each image's geometry. The corrections are in the form of mathematical models (error models) that are applied to the images' geometry parameters. The process takes as input the images' geometry parameters as well as the conjugate (sparse tie-point) image coordinates across multiple images. The tie-point image coordinates are the observations for the least squares adjustment, and are 2D locations within the sets of images that represent the same location on the ground. The least squares process minimizes the sum of the square of image discrepancies in order to simultaneously solve for the optimal error model parameters across all of the images. The image discrepancy vector is defined as the difference between the measured image coordinates and the projected image coordinates of the corresponding 3D ground location. The weights for the process are formed as the inverse of error covariances associated with the image observations, the ground location and error model parameters. Observations and parameters with smaller errors thus carry more weight in the estimation process. The mathematics and statistical foundation of photogrammetry are known and documented in detail in myriad forms in various editions of the Manual of Photogrammetry (ISBN 1-57083-071-1, ISBN 0-937294-01-2).

The output of the bundle adjustment block 306 are the corrected geometry parameters with minimized relative error, which allows the subsequent processing to make certain assumptions to improve both quality and timelines for the final 3D point clouds.

In block 308, dense tie-points are generated by a multi-ray intersection process similar to the overall flow of the sparse tie-point generation described above, except with the following key differences:

The imaging geometry used for building the line of site (LOS) vector grid are the new, bundle-adjustment-corrected geometry parameters, rather than the original parameters.

For each reference/non-reference pair, an affine rotation of both the reference image and the non-reference image is performed so that the epipolar line of the pair runs horizontally.

Since all tie-point deltas will lie in the epipolar direction, in some embodiments, only a 1D correlation process is executed for all tie-points. This increases the speed of the process and reduces blunders.

All tie-points are calculated using the original intensity imagery by utilizing a normalized cross correlation and thus the edge magnitudes and phases are not needed.

The geometric outlier rejection step is more selective than that in block 304 and rejects both large and small (based on predetermined thresholds) geometric outliers, with the assumption that all geometric outliers are the result of tie-point blunders.

The result of the dense tie-point generation 308 is a set of 1-to-N tie-points that resolve to an XYZ location in the 3D space. The tie-point density is typically 1 tie-point for every 2×2 reference pixels. Thus, the final result is a point cloud from the reference image's perspective with a resolution approximately half as dense as the original reference image. The output is similar to a known LIDAR range map, in which there is a 2D image with a range value for each post. If multiple optimal clusters are used, a separate point cloud is generated for each reference image of each optimal cluster. These point clouds are then merged into a single point cloud. In some embodiments, for each point cloud, some or all of the following metrics are captured:

The 3D XYZ location of the point.

The mean correlation score for the 1-to-N tie-points contributing to the XYZ point.

The mean figure-of-merit for the 1-to-N tie-point contributing to the XYZ point.

The mean intensity variance for the image chips that contributed to the 1-to-N tie-point The number of image rays used in the 1-to-N tie-point (i.e. 1+N)

A geometric error metric, which is the mean Euclidian distance between the 3D multi-ray intersection point and each of the contributing rays, divided by the square root of the number of rays that contributed to that point.

The reference image intensity at that point, along with the reference line/sample location of that point.

In block 310, pre-filtering is performed, using correlator and geometry metrics, where the point cloud metrics are analyzed to identify a sparse, high-confidence set of points. In some embodiments, the primary correlation metrics used in the pre-filter (e.g., from step 208 of FIG. 2) are as follows: the multi-ray intersection mean residual of less than one pixel; and the multi-ray intersection with a minimum of 3 or 4 rays to be considered as "high-confidence." These correlation metrics are byproducts of the Normalized Cross Correlation algorithm, describe above.

In some embodiments, the points with the lowest about 30% of correlation scores are rejected; the points with the lowest about 10% of intensity variances are rejected; and the points with the highest about 50% of geometric error metrics are rejected. The resulting point cloud 311 is high quality but sparse for any function performed by an end-user, however, it is a useful tool for performing a local Z-clip on the original dense data by filtering the point cloud to remove noisy points in the Z direction.

In block 312, the sparse, high-confidence point clouds are analyzed to generate a map representing a low and a high "Z" value for each "X/Y" location of each point cloud. The original dense raw points are then filtered based on whether they lie within this "Z" range. The following figure demonstrates an approach for generating an exemplary map.

Figure 4:
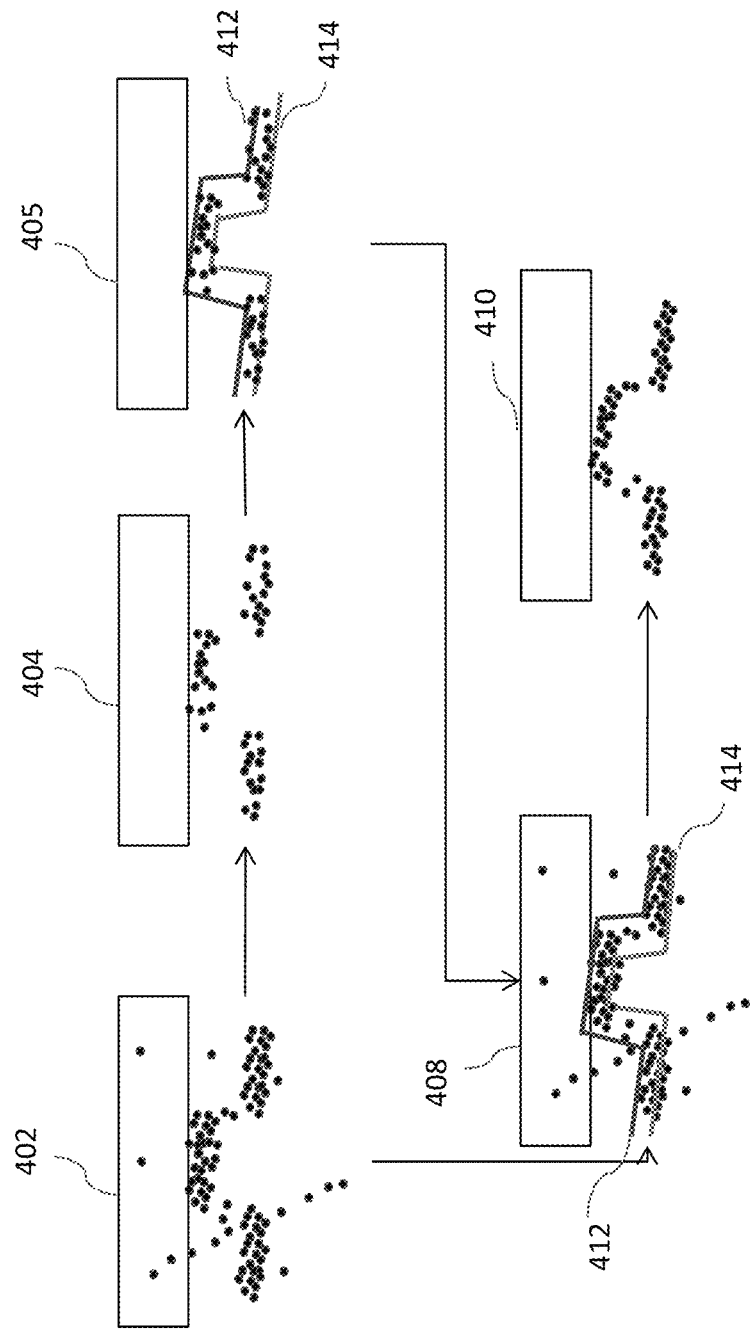
FIG. 4 illustrates a map of the location of each point cloud, according to some embodiments of the disclosed invention.

FIG. 4 illustrates a map of the location of each point cloud, according to some embodiments of the disclosed invention. As shown, a sliver of the point cloud viewed as a cross section viewed from the X/Y plane is depicted in each box 402, 404, 406, 408 and 410, with the vertical direction being the height or "Z", the horizontal being the ground direction and either "X" or "Y". The point cloud is representing some location that has a bump-structure to be modeled. In box 402, the original, raw and dense point cloud is shown. In box 404, the high-confidence points, which are the result of the pre-filtration steps are depicted. Note that the density is greatly reduced, and "wall" points have been completely removed.

The low-Z values 414 and high-Z values 412 that were calculated from the high-confidence points, which are typically about 10% (low-Z) and about 90% (high-Z) histogram value for that X/Y post plus the surrounding 8 X/Y posts are illustrated in box 405. Accordingly, the bottom 10% and top 10% of high-confidence points are considered outliers. In box 408, the low-Z and high-Z values (414 and 412) overlaid on the original raw point cloud are shown. Box 410 shows the result of the Z-clip filter, which has the original density of the raw point cloud, but with noise clutter removed. Box 410 is the output with points removed. The result of this is a filtered file.

Referring back to FIG. 3, the step of gridded point cloud generation (GRD file) occurs concurrently with the local Z-clip filtering of block 312. During the low-Z and high-Z histogram value determination, a "mid-Z" value for each X/Y post is additionally determined by collecting all the 3D point heights within that cell and surrounding, for example, 8 cells, and taking the median value of those heights. This mid-Z value for the cell is output as an Interpolated gridded (GRD) file (Point Cloud Repository) 320. Dense Filtered Point Cloud 316 are raw 3D points (outputs of step 308) that were not rejected by the pre-filter or the local z-clip filter. Digital Surface Model 318 are interpolated Z values for each Latitude/Longitude post. Dense Filtered Point Cloud 314 with holes filled with digital surface model (DSM) height values are the union of Dense Filtered Point Cloud 316 and 318 Digital Surface Model 318, all which are input to Point Cloud Repository 320. Cells that have an insufficient number of 3D points are considered "void" cells.

In summary, the point cloud generation process generates a set of unconstrained 3D points from a given set of images, or further refines those 3D points into a constrained (raster) model such as a DSM. These point clouds or models can then be exported into a point cloud repository to be used by other processes or directly exploited by a user.

In some embodiments, void cell treatment process include the following main sub-processes.

For each void cell, project rays radially from the void cell in multiple X/Y directions to find sufficient imagery to triangulate new 3D reference points for point clouds.

For each ray, persist the height value for the first non-void GRD file value reached, as long as the height value is reached within a configurable distance of the void cell.

If a sufficient percentage (for example, >50%) of rays result in a persisted height value, a percentage (for example, 20%) of the histogram height value from those persisted heights is selected. This is the value that is used to fill the void for that cell. This approach results in filling voids "low" (i.e. at ground height), which is preferable because the majority voids are caused by occlusions and shadows, which are normally on the ground. This results in ground voids being filled in with ground values.

Voids in the centers of rooftops, for instance, the 3D points found on the top of building are then filled in with surrounding values that are on the top of buildings (roof values) as long as a sufficient population of 3D points on the edge of a modeled roof where the building starts to go down to the ground (roof edge points) were successfully extracted.

The locations where the distance between height values of adjacent X/Y posts exceeds the desired ground sample distance (GSD) of the output GRD file are then identified. For any such location, we drop a vertical set of 3D points at the high post's XY location down to the low post height. This fills in the walls of buildings. The concatenation of the 3D points from the above process results in the GRD file.

In some embodiments, the GRD file is a gridded point cloud with voids filled used for certain applications and used to help with filtering true points.

In some embodiments, an optional post-process of colorization is performed on the point clouds. In this process, the points in the point cloud are colorized by each of the images that were used to build the passive 3D point cloud. A ray is then projected from each point into image space using the corrected geometry associated with that image, and an image intensity is attributed to that point based on which pixel the ray intersected. Points that are occluded by other points are labeled or attributed as undefined. For example, if the colorization process determines that a point is universally occluded by other points and thus not visible by any image, it will throw that point out as an anomalous point.

The optional process of colorization adds image intensities to the point cloud. Without image intensities, a point cloud is simply a collection of 3D (X,Y,Z) points representing the locations of structural surfaces. However, with image intensities, the point cloud can be viewed as an image, where each point has a "color" based on what type of structure it is representing. For example, a point on grass would be colored green and a point on asphalt would be colored dark gray. This extra attribution makes each 3D point a 3D+ attribute point (e.g., [X,Y,Z]+[R,G,B]) and makes it more interpretable for both a human analyst or to a downstream further processing.

Figure 5:
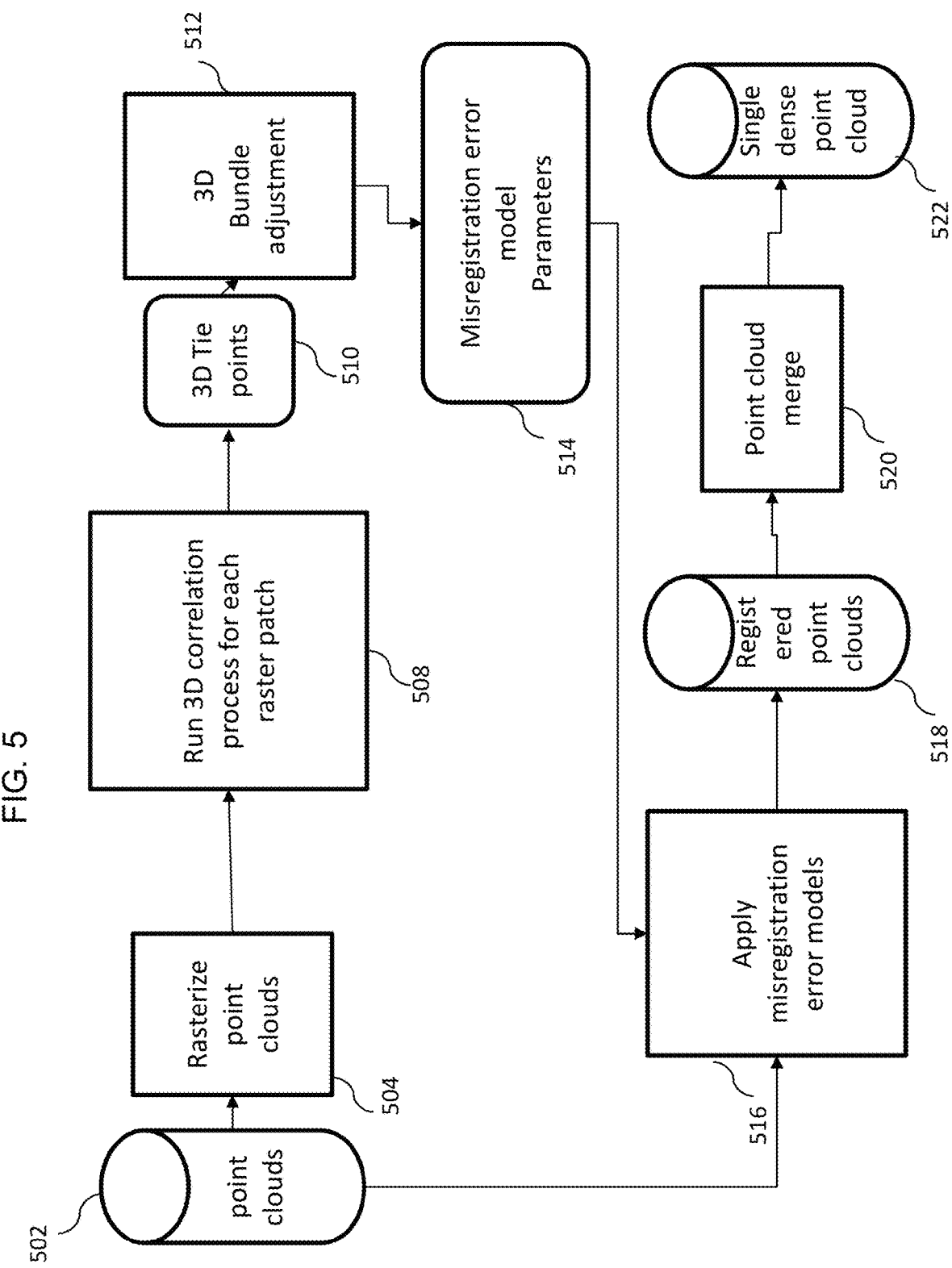
FIG. 5 is a simplified process flow diagram for 3D to 3D registration of multiple point clouds of images, according to some embodiments of the disclosed invention.

FIG. 5 is a simplified process flow diagram for 3D to 3D registration of multiple point clouds of image clusters executed by one or more processors, according to some embodiments of the disclosed invention. The point clouds are stored in a storage device 502, as the input to the process. In block 504, each of the point clouds (in the storage device 502) is selected and gridded into raster patches. Each raster patch can be considered an image patch with the height value as an intensity.

Since the input point clouds are natively stored in unconstrained 3D space, no two points from the input point clouds has the same exact 3D coordinate and thus cannot be directly compared. The rasterization 504 serves as a way of regularizing the 3D data for subsequent correlation processing. In block 508, correlation of the raster patches is accommodated via standard Normalized Cross Correlation to remove gross XY offsets. In some embodiments, this is followed by a 3D least squares correlation process for each patch. The result of the correlation processes 508 is a set of 3D tie-points, 510. Each 3D tie-point represents an XYZ coordinate in a reference point cloud from 502 along with corresponding 3D XYZ coordinates from complement point clouds from 502.

The 3D tie-points are provided as input to a 3D version of a simultaneous photogrammetric least squares bundle adjustment, 512 (as previously described for 2D imagery). For the 3D bundle adjustment, the error models representing the misalignment of the 3D point clouds are themselves three dimensional. In some embodiments, the 3D error model is a shift in each axis (X,Y,Z) between a reference point cloud within 502 and a complement point cloud within 502, resulting in three error model parameters per point cloud. In another embodiment, the 3D error model is a shift in 3D as well as three rotation angles (roll, pitch and yaw) between a reference point cloud from 502 and a complement point cloud from 502, resulting in six error model parameters per point cloud. In a third embodiment, the 3D error model includes a scale correction (for a total of 7 parameters per point cloud). The 3D bundle adjustment results in solved 3D misregistration error model parameters (block 514).

The solved 3D misregistration parameters are applied to the points in the original point clouds in block 516, resulting in 2 (or more) registered point clouds, 518. The resulting point clouds are merged (combined) in block 520 resulting in a single dense point cloud (522).

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope of the invention as defined by the appended drawings and claims.

The invention claimed is:

1. A computer vision method, executed by one or more processors, for generating a single three-dimensional (3D) model view of a geographic scene, the method comprising:
receiving image data for the scene from a plurality of sensors located at different angles with respect to the geographic scene;
dividing the image data into a plurality of image spatial regions;
correlating the image data in each image spatial region to obtain a score for each image data in each image spatial region;
grouping the image data in each image spatial region into two or more image clusters, based on the scores for each image;
performing a multi-ray intersection within each image cluster to obtain a 3D reference point for each region;
for each region, combining the one or more clusters, based on the 3D reference point for the region; and
registering the combined clusters for each region to obtain a single 3D model view of the scene, wherein registering the combined clusters comprises:
rasterizing patches in two or more point clouds derived from the two or more image clusters;
determining 3D tie-points between the two or more point clouds via cross correlation processing;
performing a 3D bundle adjustment to determine misregistration error model parameters between the two or more point clouds;
applying the misregistration error model parameters to original point clouds, resulting in registered point clouds; and
merging the registered point clouds, resulting in a single, dense point cloud comprising of point clouds from each cluster.

2. The method of claim 1, wherein the plurality of sensors are located on one or more platforms.

3. The method of claim 1, wherein the plurality of image spatial regions are obtained by grouping the image data into coordinal and inter-coordinal map locations.

4. The method of claim 1, wherein the image data is divided into the plurality of image spatial regions by selecting a reference image, finding correlation sets with higher strength that have diversity of convergence angles and ensuring image spatial regions have the largest convergence angles from all other groups.

5. The method of claim 1, wherein correlating the image data further comprises geometrically analyzing each image spatial region and photogrammetrically analyzing each image spatial region to obtain a score for each image data in each image spatial region.

6. The method of claim 1, wherein the score indicates a predicted quality of a point cloud generated from a corresponding image spatial region.

7. The method of claim 1, wherein the multi-ray intersection utilizes a triangulation method.

8. The method of claim 1, wherein the multi-ray intersection generates dense tie-points as a set of 1-to-N tie-points that resolve to an XYZ location in a 3D space to generate a point cloud from a reference image's perspective with a resolution half as dense as an original reference image.

9. The method of claim 1, wherein combining the two or more clusters comprises merging multiple point clouds from each cluster perspective into a single point cloud representing the full scene.

10. The method of claim 1, wherein correlating the image data utilizes a normalized-cross correlation score.

11. A computer vision system for generating a single three-dimensional (3D) model view of a geographic scene comprising:
one or more processors;
storage medium coupled to the one or more processors; and
I/O circuits, wherein the one or more processors:
receive image data for the scene from a plurality of sensors located at different angles with respect to the geographic scene;
divide the image data into a plurality of image spatial regions;
correlate the image data in each image spatial region to obtain a score for each image data in each image spatial region;
group the image data in each image spatial region into two or more image clusters, based on the scores for each image;
perform a multi-ray intersection within each image cluster to obtain a 3D reference point for each region;
for each region, combine the one or more clusters, based on the 3D reference point for the region; and
register the combined clusters for each region to obtain a single 3D model view of the scene, wherein registering the combined clusters comprises:
rasterizing patches in two or more point clouds derived from the two or more image clusters;
determining 3D tie-points between the two or more point clouds via cross correlation processing;
performing a 3D bundle adjustment to determine misregistration error model parameters between the two or more point clouds;
applying the misregistration error model parameters to original point clouds, resulting in registered point clouds; and
merging the registered point clouds, resulting in a single, dense point cloud comprising of point clouds from each cluster.

12. The system of claim 11, wherein the plurality of sensors are located on one or more platforms.

13. The system of claim 11, wherein the plurality of image spatial regions are obtained by grouping the image data into coordinal and inter-coordinal map locations.

14. The system of claim 11, wherein the processor divides the image data into the plurality of image spatial regions by selecting a reference image, finding correlation sets with higher strength that have diversity of convergence angles and ensuring image spatial regions have the largest convergence angles from all other groups.

15. The system of claim 11, wherein the processor correlates the image data by geometrically analyzing each image spatial region and photogrammetrically analyzing each image spatial region to obtain a score for each image data in each image spatial region.

16. The system of claim 11, wherein the score indicates a predicted quality of a point cloud generated from a corresponding image spatial region.

17. The system of claim 11, wherein the processor performs the multi-ray intersection to generate dense tie-points as a set of 1-to-N tie-points that resolve to an XYZ location in a 3D space to generate a point cloud from a reference image's perspective with a resolution half as dense as an original reference image.

18. The system of claim 11, wherein the processor combines the two or more clusters by merging multiple point clouds from each cluster perspective into a single point cloud representing the full scene.

* * * * *